(No Model.)
G. H. SPAULDING.
PITMAN CONNECTION FOR MOWING MACHINES.
No. 474,767.  Patented May 10, 1892.
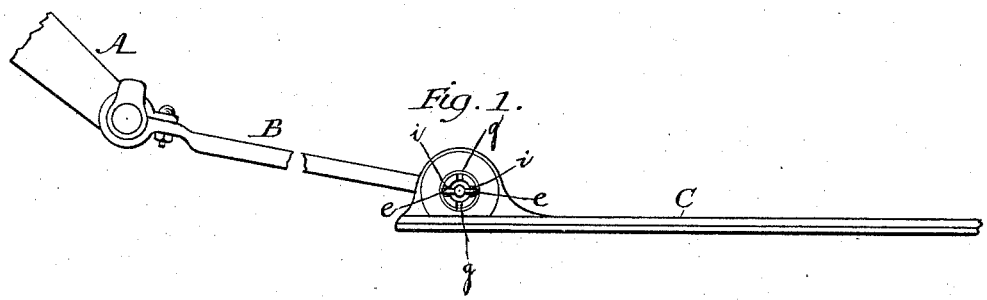
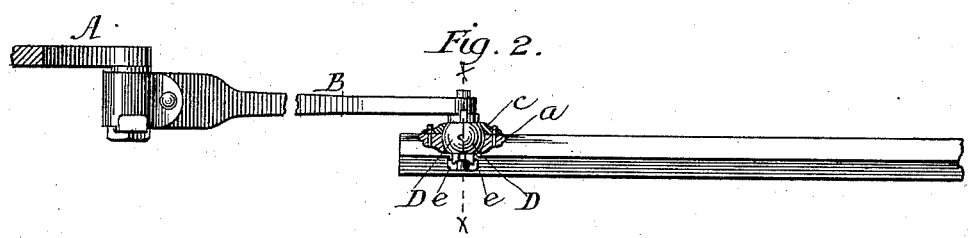
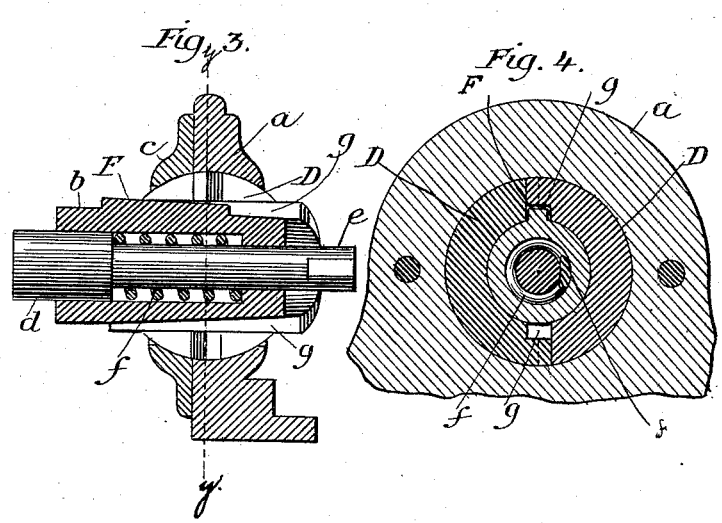
Witnesses
James K. Pumpelly
Chas. H. Evans
George Henry Spaulding
Inventor
By his Attorney
Frank D. Thomason

UNITED STATES PATENT OFFICE.

GEORGE HENRY SPAULDING, OF CHICAGO, ILLINOIS.

PITMAN CONNECTION FOR MOWING-MACHINES.

SPECIFICATION forming part of Letters Patent No. 474,767, dated May 10, 1892.

Application filed December 7, 1889. Serial No. 332,955. (No model.)

*To all whom it may concern:*

Be it known that I, GEORGE HENRY SPAULDING, of Chicago, Cook county, Illinois, have invented certain new and useful Improvements in Pitman Connections for Mowing-Machines, of which the following is a full, clear, and exact description, reference being had to the accompanying drawings, and to the letters of reference marked thereon.

My invention relates particularly to the pitman connection of the reciprocating knife-bar of mowing-machines; and its object is to make a limited swivel connection so that without change it will adapt itself to the various positions said bar may be adjusted to, substantially as hereinafter fully described, and as illustrated in the drawings, in which—

Figure 1 is a front elevation of the crank-pitman and a portion of the knife-bar. Fig. 2 is a plan view of the same with part of the bearing of the pitman connection to the knife-bar broken away. Fig. 3 is a transverse vertical section through said knife-bar and pitman connection, taken on line $xx$, Fig. 2; and Fig. 4 is a transverse section on line $yy$, Fig. 3.

Referring to the drawings, A represents the pitman-crank of a mowing or reaping machine, B the pitman, and C the knife-bar. In the most improved reaping-machines of the day it is considered desirable that the knife-bar should be adjustable vertically, or so that the knife can be tilted up or down. This necessitates a swivel connection to a limited extent between the pitman and knife-bar. I provide such a connection by making a sort of ball-and-socket joint.

The lug $a$ at the adjacent end of the knife-bar C, which lug has a circular opening through it for the stud $b$ of the pitman to pass through, has one side of it adjacent to and concentric with said opening made concave, and secured to the side of said lug in which said concavity exists is a plate $c$ with a corresponding opening therein, which has its side adjacent to said lug provided with a corresponding concavity concentric with its opening, which, together with that of the lug, makes a bearing whose surface conforms to the circumference of a circle struck from the center of a bearing-opening, as shown. The purpose of these concave edges is to make a socket or spherical bearing for said pitman-stud $b$. Of course with a spherical bearing a ball-journal would be necessary. I prefer, however, not to make this ball-shaped journal a part of the stud, for if I did just as soon as the journal or bearing began to wear the connection would become loose and would rattle. So, therefore, I provide the contact-plates D D, which fit within the socket-bearing and run the stud $b$ through them. These contact-plates are made just as though a ball or spherical-shaped hollow journal was divided centrally and longitudinally into two parts, with their end edges merging into a cylindrical extension on both sides, which was of less diameter than the circular openings leading to said socket-bearings.

The stud $b$ of the pitman I make slightly tapering toward its outer end, and prefer to make the seat therefor in the bore of said plates correspond thereto. Thus when said stud is seated and by a suitable nut or by other means drawn farther into said seat it spreads plates D apart and thus takes up the wear. I prefer to provide means for drawing stud $b$ between plates D, which will automatically keep said plates D apart, so as to take up the wear. This consists of a bolt $d$, which is seated in a longitudinal central opening or bore in said stud, has wings $ee$ on its end which passes through the said socket-bearings, and which bolt $d$ is acted upon by a spring $f$, so as to cause the shoulders of said wings $e$ to bear against the end of the stud when not in position. The projection of these wings $e$ of bolt $d$ is such that longitudinal grooves $gg$ have to be made diametrically opposite each other in the bore of plates D D, so as to permit their passage therethrough when it is desired to withdraw bolt $d$. When the stud is run between said plates and properly seated, the bolt $d$ is pulled farther through said plates until out of grooves $g$, and turned so that the shoulders of wings $e$ will bear against the end edges of said plates and rest in the notches $i\,i$ made therein, as shown. In order to confine the bolt in such turned position, I notch the end edges of said plates, preferably at points $h$, intersected by a straight line drawn through the center of said bolt at right angles to the plane of the grooves.

While I do not deem it indispensable, I consider that the spreading of plates D to take up the wear will be better assured if the longitudinal wedges F, which project from said stud in alignment with the normal position of the wings of bolt $d$, are used. These wedges are preferably made integral with the stud and enter the grooves $g\ g$ in the bore of plates D D, so as to spread them as the stud is drawn farther and farther into said plates.

For the better effect of the wedges F, I prefer to place grooves $g$, so that they can be made by rabbeting the inner butt edges of both of the said plates.

What I claim is—

1. The combination, with pitman B, a tapering stud $b$, having a longitudinal wedge F thereon, and journal-contact plates D, fitting over said stud and having a spherical bearing-surface, of the knife-bar and a bearing at the end thereof having an interior surface made the obverse of the journal-surface of the plates D.

2. The combination, with a pitman B, a stud $b$, contact-plates D, fitting over the said stud, and the spring and bolt $d$, placed longitudinally in said stud, the said bolt having lateral projections on the outer end thereof, of the knife-bar C and a bearing for plates D thereon, as set forth.

3. The combination, with a pitman B, a stud $b$, having a longitudinal wedge F thereon, and journal-plates D, fitting over said stud, of the knife-bar and a bearing thereon for said contact-plates, as set forth.

GEORGE HENRY SPAULDING.

Witnesses:
F. H. GOIN,
F. D. THOMASON.